March 23, 1971     A. H. WHITE     3,572,365

MAIN FUEL METERING VALVE

Filed May 19, 1969     2 Sheets-Sheet 2

INVENTOR
ALBERT H. WHITE
BY Radford W. Luther
ATTORNEY

United States Patent Office 3,572,365
Patented Mar. 23, 1971

3,572,365
MAIN FUEL METERING VALVE
Albert H. White, Wethersfield, Conn., assignor to
Chandler Evans, Inc., West Hartford, Conn.
Filed May 19, 1969, Ser. No. 825,548
Int. Cl. F16k 31/42
U.S. Cl. 137—117                    6 Claims

ABSTRACT OF THE DISCLOSURE

A main metering valve for a fuel system having a spool including first and second spaced lands slideably mounted in a housing. A bore, containing a restriction, passes through the spool and the lands to communicate fuel, of a regulated pressure, adjacent the outboard face of the first land, to the outboard face of the second land. The pressure of the communicated fuel adjacent the outboard face of the second land is controlled by a torque motor. An inlet port, located intermediate the lands, admits fuel from a segment of a main fuel supply line which flows outwardly from an outlet port adapted to be partially covered by the first land. A feedback potentiometer sends a signal which is compared with an input command signal for generating an error signal to the torque motor. A constant differential pressure is maintained between the inlet and outlet ports so that fuel flow is a function of spool position.

BACKGROUND OF THE INVENTION

This invention pertains generally to a fuel control system for a gas turbine engine. More particularly, this invention pertains to main metering valves in fuel control systems for gas turbine engines. Even more particularly, this invention pertains to main metering valves in fuel control systems which embody a valve position feedback feature. This invention further pertains to fuel control systems in which the output flow is a non-linear function of metering valve position.

Fuel metering valves in the past have frequently embodied a structure which included at least two major components, namely, a valve including a movable valve element, and a valve actuator. It is desirable to have a unitary structure serve as both the valve and the valve actuator, since such an arrangement will contribute to a reduction in the volume, weight, and complexity of a fuel system in which it is included.

A prior art solution to the aforementioned problem has been the provision of bleed hole in a land of the valve and the inclusion of a pressure control device for controlling the pressure on a face of the land so as to permit positioning of the metering valve. A deficiency in this approach to the problem is that these structures are sensitive to the pressure at the inlet to the metering valve.

In a valve and valve actuator arrangement, an installation problem often arises in connection with the incorporation of a feedback device such as a potentiometer. If the potentiometer is located adjacent the valve housing, remote from the valve element, it becomes necessary to provide a seal in the housing to surround the member which actuates the potentiometer. As the valve element projecting from the housing also requires a seal, at least two seals are required in the valve housing, thus impairing its integrity. If the potentiometer is mounted upon the housing adjacent the valve element, in order to obviate the provision of an additional seal, it is necessary to elongate the valve element so as to accommodate the potentiometer, thereby occasioning an over-all volume increase.

SUMMARY OF THE INVENTION

The instant invention is a unitary valve actuator and metering valve structure which includes a housing and a novel spaced land arrangement on the spool disposed therein which is associated with various fuel lines. Succinctly stated, a valve spool is provided with two spaced lands, with a metered fuel flow passing therebetween. The peripheral surface of a land serves to meter the fuel flow, while the outboard faces of the lands function as an actuator piston. A control force differential established on outboard faces of the lands determines the axial position of the spool, which in turn regulates the fuel flow. The invention permits the incorporation of a potentiometer in association with a main metering valve housing without significantly sacrificing the integrity of the housing.

Accordingly, it is a primary object of this invention to provide a main metering valve for a fuel system which comprises a unitary structure.

Another object of this invention is to provide a main metering valve for a fuel system which will tend to minimize the volume requirements of the system.

Yet another object of this invention is to provide a main metering valve for a fuel system which will facilitate the inclusion of a feedback device.

These and other objects will become readily apparent to those skilled in the art from the following detailed description taken in conjunction with the accompanying drawings.

DETAILED DESCRIPTION OF THE PREFERRED EMBODIMENT

Figure 1:
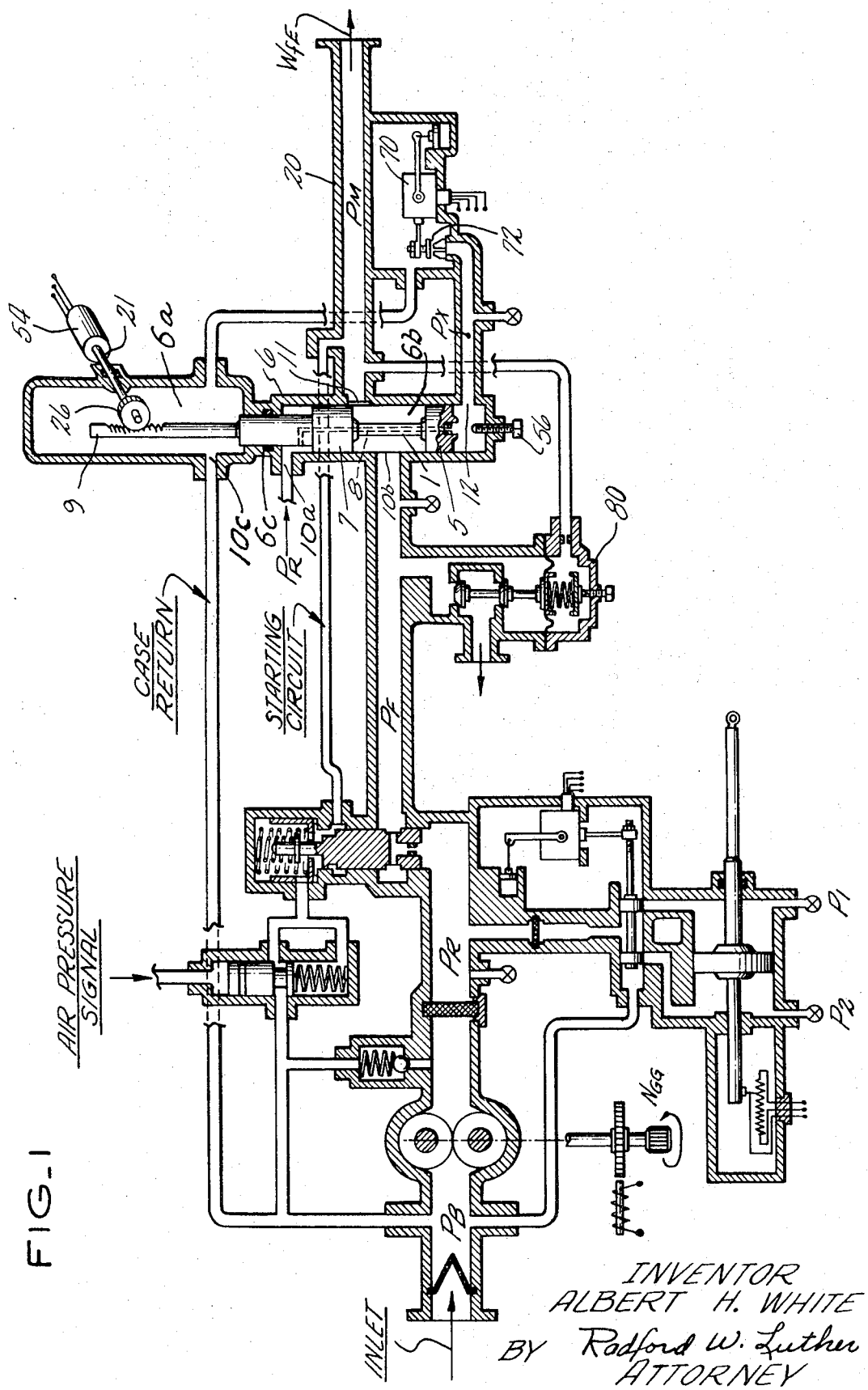
FIG. 1 is a schematic diagram of a fuel system incorporating a main metering valve in accordance with the invention.

Referring now to the drawings wherein like characters are used throughout to designate like elements, in FIG. 1 there is shown a schematic diagram of a fuel system that embodies the invention. The details of the construction and operation of the complete fuel system, together with its associated control devices, are fully shown and described in my co-pending applications of U.S. Ser. Nos. 825,857 and 825,818, respectively filed May 19, 1969 and May 19, 1969, respectively entitled Hybrid Fuel Control and Slug Pump and Pressurizing Valve for Fuel Control System. They are repeated here only to the extent necessary for a complete understanding of the main metering valve of this invention.

Figure 3:
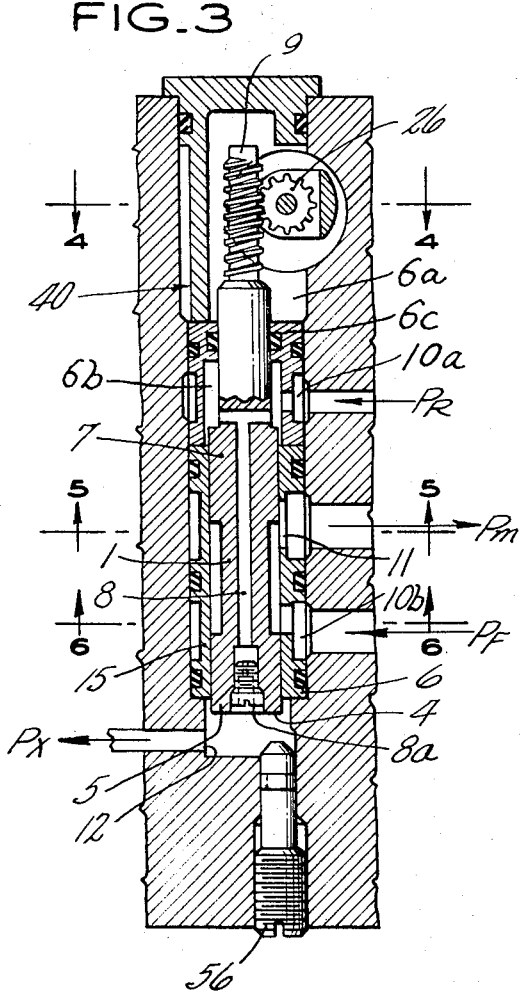
FIG. 3 is a longitudinal sectional view of a preferred embodiment of a main metering valve according to the invention.

FIGS. 1 and 3 show a valve spool 1, with a first land 7 and a second land 5 mounted thereon, slideably disposed in a housing or valve sleeve 6 for axial movement therein. The housing 6 has an upper chamber 6a and a lower chamber 6b, sealed from each other in all spool positions by a seal structure 6c which surrounds the spool 1. It will be noted that the lands are spaced on the spool so as to define an annular groove therebetween. A first inlet port 10a, defined within the housing in the upper portion of the lower chamber adjacent the outboard face of the first land, is connected to a source of regulated pressure (not shown). A bore 8 passes through the spool 1 and the lands 5 and 7 to communicate fuel, of a regulated pressure $P_R$ adjacent the outboard face of the first land, to the outboard face of the second land. A segment of a main fuel supply line communicates with second inlet port 10b in housing 6 to carry a main fuel flow within the housing which passes between lands 5 and 7, before emerging at first outlet port 11, which in its preferred form is shaped as an inverted triangle. As can be readily ascertained from either FIG. 1 or FIG. 3, the position of land 7 dictates the area of outlet port 11 and, hence, the rate of the flow passing therethrough. Since the inboard faces of the lands are both exposed to the pressure of the fuel flowing between them, it is manifest that there is no pressure differential created therebetween and hence the valve is rendered insensitive to inlet pressure variations.

The ratio of the outboard face areas of the lands 5 and 7 is 2:1, so that control pressure $P_X$ can effect a movement of the spool in either direction. In the lower portion of housing 6, a minimum flow stop 56 is threadably secured to limit the downward movement of spool 1 to insure a minimum flow of fuel through first outlet port 11. The spool 1 is thus movable between a first position, in which the first outlet port 11 is uncovered and hence has a maximum effective area presented to the groove between the lands, and a second position, in which the minimum flow stop is contacted to thereby define the minimum effective area of the first outlet port 11. It will be noted that in all spool positions, states of fluid communication between the following elements continuously exist: the first inelt port 10a and the outboard face of first land 7; the second inlet port 10b and the groove between inboard faces of lands 5 and 7; the first outlet port 11 and the groove; the second outlet port 12 and the outboard face of land 5; and the lower chamber 6b adjacent the outboard face of land 7 and the lower chamber adjacent the outboard face of second land 5.

Figure 4:
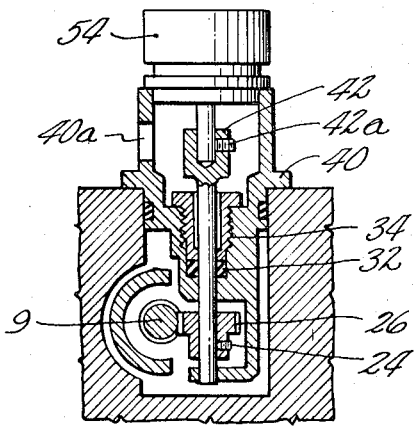
FIG. 4 is a transverse sectional view of the embodiment of FIG. 3 taken generally along line A—A of FIG. 3.

A feedback potentiometer 54 is operatively connected to the valve spool by means of a rack 9, and a pinion 26, which are both contained within housing 6. A shaft 21 passes through the housing 6 and is connected to potentiometer 54, which is mounted thereon (FIG. 4). The upper chamber 6a, which contains the rack and pinion, is provided with reference port 10c which communicates with boost pressure ($P_B$) in the main fuel supply line to render the metering valve insensitive to changes in ambient pressure which would otherwise affect valve operation.

An error signal $V_E$, which is indicative of the difference between the spools commanded position and its actual position, is applied to torque motor 70. The torque motor 70 acts to control the flow by restricting its emergence through flapper valve 72 which serves to regulate the pressure $P_X$ adjacent second outlet port 12, the pressure $P_X$ being applied to the outboard face of land 5.

A metering head regulator 80 maintains a constant differential pressure ($P_F - P_M$) across the ports 10b and 11 which fluidly communicate with respective segments of the main fuel supply line 20. The rate of flow in the main fuel supply line segment which communicates with first outlet port 11 is then dependent on the area of port 11. The rate of fuel flow to the engine is therefore essentially a function of the spool's position.

FIG. 3 is a detailed longitudinal sectional view of a preferred form of the main metering valve of the invention. A drain plug 8a is threadably inserted within second land 5 to restrict the flow issuing from the T-shaped bore 8 to port 12. The potentiometer 54 (FIG. 4) is driven by circular rack 9 (which has a thread of zero pitch thereon) through a pinion 26, the center of rotation of which is adjustable by set screw 24, to achieve a firm contact between the rack and pinion. Integrally mounted for rotation within the pinion and potentiometer housing 40 is potentiometer shaft 42 which is isolated from upper chamber 6a by a threaded hollow plug 34 and O-ring seal 32. Adjustment of the potentiometer 54 can be made by utilizing set screw 42a, accessible through opennig 40a.

Figure 5:
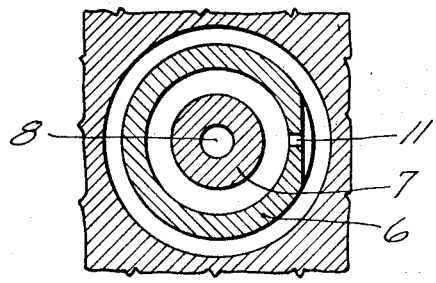
FIGS. 5 and 6 are sectional views of the embodiment of FIG. 3 taken along lines B—B and C—C respectively.
Figure 6:
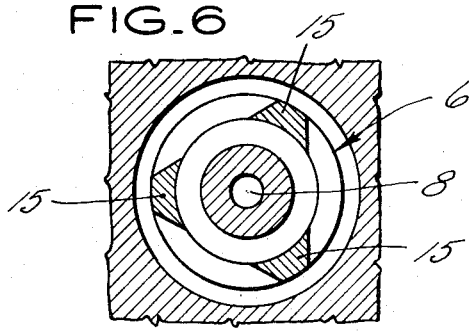

FIGS. 5 and 6 show the construction of the valve sleeve as viewed from respective stations B—B and C—C. As can be seen from FIGS. 5 and 6, the valve sleeve at station B—B is essentially annular, while at station C—C, the sleeve is formed by three identical struts 15.

Figure 2:
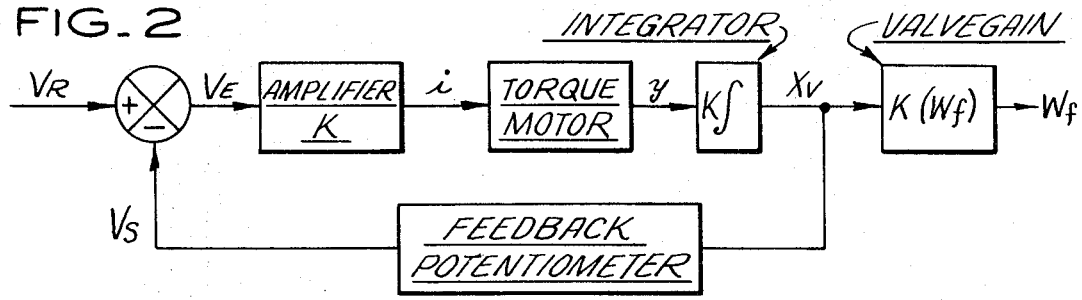
FIG. 2 is an operational block diagram which illustrates the operation of the main metering valve of FIG. 1.

The operation of the disclosed valve will be explained with reference to FIGS. 1 and 2. An input command signal $V_R$ is summed with a feedback signal from the potentiometer to yield an error signal $V_E$ that is directed to an amplifier which produces a current $i$ to actuate the torque motor 70. The displacement of the torque motor $y$ varies the flow emitted from flapper valve 72 by restricting its passage therethrough to obtain velocity $dX_V/dt$ of spool 1, the integral of which is the displacement of spool 1, wherein the first land changes the area of first outlet port 11 (shown as valve gain in FIG. 2) to meter the flow to the engine $W_F$. The flow stop 56 insures that the engine will receive a minimum flow of fuel irrespective of the control pressure $P_X$. The fuel passing through the valve 72 is returned to the main fuel supply line via rack and upper chamber 6a by the case return (shown schematically as a line).

While the invention has been shown and described with reference to a preferred embodiment, it will be understood that many changes and modifications may be made thereto without departing from the scope or spirit of the invention.

I claim:
1. A main metering valve for a fuel control system comprising:
 a housing having an upper chamber and a lower chamber;
 a spool mounted within the housing for axial movement in both of the chambers between a first position and a second position;
 a first land mounted on the spool such that it slidingly contacts the wall of the lower chamber during axial movement of the spool;
 a second land mounted on the spool in spaced relationship to the first land, the second land being mounted such that it slidingly contacts the wall of the lower chamber during axial movement of the spool, each of the lands having an inboard face and an outboard face, the inboard faces being of substantially equal area and directly communicating with a groove defined therebetween to render the valve insensitive to inlet pressure variations and the outboard face area of the second land being greater than that of the first land to permit bidirectional movement of the spool;
 a first inlet port defined within the housing in communication with the lower chamber for receiving fuel of a regulated pressure, the first inlet port being located so as to communicate with the outboard face of the first land in the first and second spool positions;
 a second inlet port defined within the housing for receiving fuel flow from a segment of a main fuel supply line, the second inlet port being located intermediate the inboard faces of the lands such that it directly communicates with the groove in the first and second spool positions;
 a first outlet port defined within the housing adjacent one of the lands such that it directly communicates with the groove in the first and second spool positions, the first outlet port adapted to be connected to another segment of the main fuel supply line, the effective area of the first outlet port varying with the position of the spool such that it is a maximum in the first spool position and a minimum in the second spool position;
 a second outlet port defined within the housing in communication with the lower chamber for directing a control pressure to the outboard face of the second land, the second outlet port being located so as to communicate with the outboard face of the second land in the first and second spool positions;

means to limit the minimum area of the first outlet port irrespective of the control pressure to insure a minimum fuel flow therethrough;

passage means to place the lower chamber adjacent the outboard face of the first land in communication with the lower chamber adjacent the outboard face of the second lands;

means to surround the spool to seal the upper chamber from the lower chamber;

means to generate a feedback signal representative of the position of said spool;

means responsive to the feedback signal and an input command signal to control the flow through the second outlet port for varying the control pressure on the outboard face of the second land, the spool being positioned by the control pressure.

2. A main metering valve, as defined in claim 1, in which there is further provided: means to communicate the upper chamber to a reference pressure in the main fuel supply line to render the metering valve insensitive to changes in ambient pressure.

3. A main metering valve, as defined in claim 2, in which there is further provided: means to maintain a constant pressure differential between the second inlet port and the first outlet port.

4. A main metering valve, as defined in claim 3, in which the outboard face area of the first land is substantially one-half the outboard face area of the second land.

5. A main metering valve, as defined in claim 4, in which the passage means comprises: a bore extending axially through the spool and the lands and emerging adjacent the outboard faces of the lands.

6. A main metering valve, as defined in claim 1, in which the feedback signal generating means comprises:
- a potentiometer mounted without the chambers of the housing; and
- means to extend into the upper chamber to interconnect the potentiometer and the spool; and in which the signal responsive means comprises:
- a torque motor operatively connected to the potentiometer; and
- a flapper valve connected to the torque motor and positionable thereby, the flapper valve being in communication with the second outlet port.

References Cited

UNITED STATES PATENTS

| | | | |
|---|---|---|---|
| Re. 25,391 | 5/1963 | Farkas | 137—117 |
| 2,722,234 | 11/1955 | MacGeorge | 251—33X |
| 2,790,427 | 4/1957 | Carson | 137—85X |
| 2,854,956 | 10/1958 | Hager | 137—85UX |
| 2,953,123 | 9/1960 | Reen et al. | 137—625.64X |
| 2,972,999 | 2/1961 | Hayner | 137—85 |
| 3,152,603 | 10/1964 | Zeisloft | 137—117 |

ROBERT G. NILSON, Primary Examiner

U.S. Cl. X.R.

251—30